Figure 1:
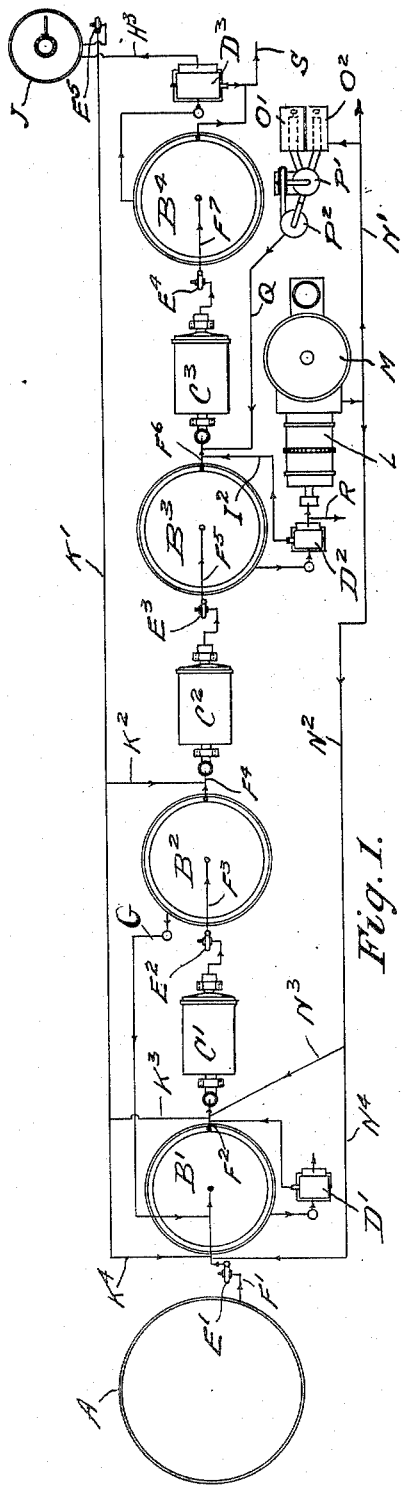

Jan. 22, 1929.

G. C. HOWARD 1,699,845

PROCESS OF TREATING WASTE SULPHITE LIQUOR

Filed Nov. 22, 1926

INVENTOR
Guy C. Howard
BY
Derek James
ATTORNEY

Patented Jan. 22, 1929.

1,699,845

UNITED STATES PATENT OFFICE.

GUY C. HOWARD, OF SEATTLE, WASHINGTON.

PROCESS OF TREATING WASTE SULPHITE LIQUOR.

Application filed November 22, 1926. Serial No. 149,976. REISSUED

My invention relates to an improved process of treating waste sulphite liquor resulting from the manufacture of paper pulp by the sulphite process, whereby economic values are realized therefrom. It consists essentially in progressively precipitating certain constituents from the waste liquor and in recovering such precipitated matter from the residual liquor. The improvement over existing processes lies in the novel procedure whereby the precipitation is effected and in the novel manner by which the resulting precipitate is segregated into component parts. Its advantages lie in simplicity of operation and in economies due to increased yield and better segregation of products.

Waste sulphite liquor is an aqueous solution of non-cellulose substances which have been dissolved from the wood by the process of digestion. The major portion of the material in solution is regarded as a calcium salt of lignin sulphonic acid. Various carbohydrates are also present in considerable amounts and, as minor constituents, there are some resins, oils, porteins and, usually, free sulphur dioxide.

In the sulphite process of digestion the complex carbohydrates of the wood evidently hydrolize to simpler forms of carbohydrates which are soluble, and there is no apparent tendency for the complex types to re-form and precipitate in the waste sulphite liquor through reversal reactions. On the other hand, the lignin complex of the wood appears to go into solution through reaction with the calcium acid sulphite of the cooking liquor whereby a calcium salt of lignin sulphonic acid is formed. This reaction is reversible and tends to precipitate dissolved matter in the waste liquor except as equilibrium is established by the products of such reversal reactions.

The addition of suitable reagents, whereby the waste liquor is made alkaline and the concentration of sulphite ions ($SO_3$) and sulphate ions ($SO_4$) are kept as low as possible, favors the reversal reactions. These may be carried practically to completion under the procedures embodied in this invention, with the result that calcium sulphite and an amount of organic matter equivalent to substantially all the lignin constituent in the waste liquor can be precipitated and recovered as separate products, and the carbohydrate content retained in the residual liquor. Calcium oxide, or hydroxide (caustic lime), is a commercial reagent that meets the requirements for precipitation, and from an economic standpoint is preferred, although I do not wish to confine myself to this reagent alone.

When calcium oxide, or hydroxide, is added gradually, with stirring, to waste sulphite liquor, a white crystalline precipitate begins to form at once and the liquor darkens in color. This continues as more lime is added until the liquor becomes a distinct purplish color and a heavy crystalline precipitate readily settles out and the liquor tests alkaline. Analysis shows this precipitate to be calcium sulphite together with a minor amount of calcium sulphate, but practically free from organic matter. The sulphur thus precipitated up to this purple stage amounts to approximately one-half of the total sulphur contained in the original liquor.

On filtering out this crystalline precipitate and slowly adding more lime to the clear filtrate, a further precipitation takes place which is a mixture of fine crystals and organic matter. At first this organic precipitate is highly dispersed and difficult to filter out, but with more lime it increases in amount and finally flocculates to a voluminous yellow precipitate intimately mixed with fine crystals, which settle gradually and filters readily. The amount of organic matter thus precipitated up to this distinct flocculation point is not sufficient to account for all the lignin constituent of the sulphite liquor. The addition of more lime causes a further precipitation of organic matter, but I have found it impossible to effect complete precipitation of the lignin content by thus adding lime in the presence of all this flocculated organic precipitate, at least without the use of such a large excess as to be prohibitive from an economic standpoint, and it is doubtful whether it can be completely accomplished without first removing the initial flocculated precipitates. If, however, the flocculated precipitate is removed and an excess of fresh lime reagent added a substantially complete precipitation of the remaining lignin content can be accomplished.

Various significant facts may be observed when calcium oxide or hydroxide is added to waste sulphite liquor. The solid phase lime particles are immediately coated over with a mixture of organic matter and small crystals similar to the yellow precipitate mentioned above. This coating is soluble in the sulphite liquor itself prior to the system reaching the purple stage, and beyond this stage the coating evidently does not materially mask the reaction surface of the lime particles until the system reaches the condition at which the yellow precipitate flocculates. After this flocculation point is reached the reaction seems to lag even though lime reagent is still present. The liquor initially is unsaturated with calcium sulphate but becomes saturated at some stage of the process since the residual liquor after complete precipitation of the lignin is so saturated. Whether this increased sulphate content is due to oxidation of calcium sulphite or to calcium sulphate being a direct product of the decomposition of some lignin sulphonic acid combination is not known nor what, if any, relation it may have to the flocculation of the precipitate.

These observations indicate that the reaction by which the yellow organic matter is precipitated by the lime reagent is one that takes place most readily, if not entirely, at the surface of solid phase lime particles and that the flocculated precipitate of organic matter tends to adsorb to and mask the lime surfaces. It cannot be said with certainty that the precipitation takes place only at such surfaces but there is evidence indicating that the presence of fresh solid phase lime facilitates precipitation. It is an accepted principle that an excess of reagent must be used to assure complete precipitation and, apparently, the problem in precipitating sulphite liquor with lime is to effectively establish this excess in the presence of a flocculated organic precipitate which tends to adsorb to and mask the reagent surfaces.

In order to precipitate the maximum amount of organic matter from sulphite liquor with the use of a minimum quantity of lime reagent, I have found the best results are obtained by adding substantially all of the lime reagent to the residual liquor, from which the major portion of the lignin constituent has been previously removed, whereby a practically complete precipitation of the lignin remaining in this residual liquor is effected, and then separating out this precipitate and using the unconsumed lime together with its associated lignin precipitate as the reagent to throw down the major portion of the lignin in a fresh quantity of sulphite liquor. This procedure assures an excess of reagent at the proper stage and a large free surface of solid phase lime to facilitate complete precipitation of the lignin in the tail liquors, and it best conserves the lime reagent in that the excess is returned to the system for treatment of fresh liquor. It also aids the segregation and removal of both the inorganic and organic products derived from the liquor.

In principle and in effect this procedure is quite different from simply adding an excess of reagent to the original liquor in order to get complete precipitation, especially when dealing with a reaction of this character wherein the flocculated precipitate of organic matter tends to adsorb to and mask the lime surfaces.

In the accompanying drawing,—

Figure 2:
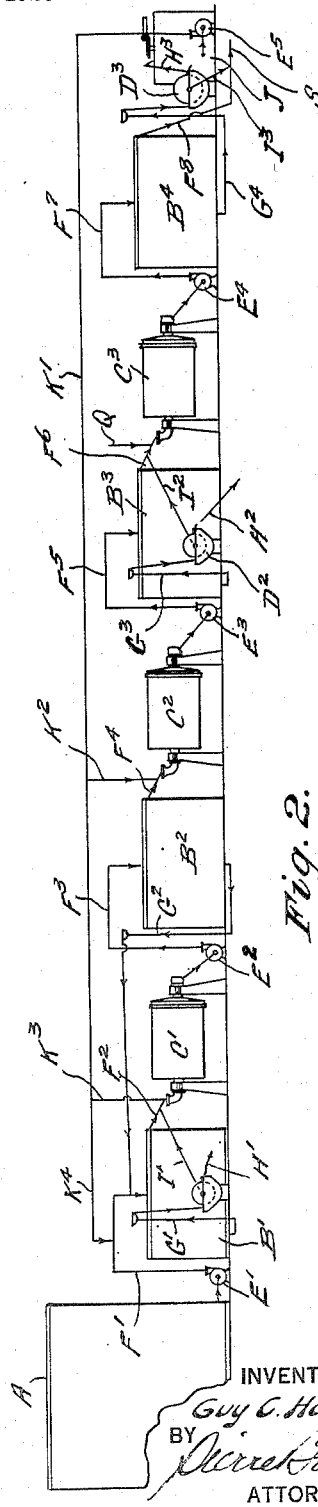

Figure 1 is a plan view and Fig. 2 a side elevation with parts omitted of apparatus, which illustrates diagrammatically my process.

In said drawing, A represents a storage tank in which waste sulphite liquor is collected, $B^1$, $B^2$, $B^3$, and $B^4$ are sedimentation tanks of the Dorr type or equivalent. $C^1$, $C^2$, and $C^3$ are reaction cells disposed intermediate the successive sedimentation tanks which provide suitable time and mechanical mixing to accomplish the desired reaction, and in which the temperature of the liquor in process can be elevated or sustained by means of steam supplied through pipes, not shown. $D^1$, $D^2$, and $D^3$, are filters of the continuous drum type. $E^1$, $E^2$, $E^3$, $E^4$, and $E^5$, are pumps. $F^1$, $F^2$, $F^3$, $F^4$, $F^5$, $F^6$, $F^7$, and $F^8$, are overflow and other liquor pipe lines. $G^1$, $G^2$, $G^3$, and $G^4$, are underflow liquor pipe lines; and $H^1$, $H^2$, and $H^3$ are filter cake lines. J is a storage tank with agitator for the intermediate or secondary reagent. $K^1$, $K^2$, $K^3$, and $K^4$ are secondary reagent lines, and Q is a primary reagent supply line. L is a rotary combustion furnace in connection with a steam boiler M; and $N^1$, $N^2$, $N^3$, and $N^4$ are pipe lines for conveying the ash reject from the furnace L. $O^1$, $O^2$, and $P^1$, $P^2$ are dry reagent storage bins and pulverizing equipment.

With reference to this drawing, the process may be described as follows: The overflow liquor from $B^3$, together with the filtrate from filter $D^2$ through $I^2$, constitutes sulphite liquor from which the major portion of the lignin content has been removed, as will be explained later. Such sulphite liquor enters reaction cell $C^3$ through pipe $F^6$ and into which is added through pipe Q all the primary lime reagent used by the process. This reagent may consist entirely of fresh calcium oxide or hydroxide, or this caustic lime may be mixed with part, or all, of the pulverized ash derived from rotary furnace L, the function of which will be explained later.

In cell $C^3$ the reaction is completed whereby substantially all the remaining lignin content of the liquor is precipitated by reason of the relative excess of reagent and the free solid phase lime surface available.

The precipitated liquor then passes through pump $E^4$ to sedimentation tank $B^4$, in which the precipitated matter together with its associated unconsumed reagent settles out, and is withdrawn through underflow pipe $G^4$ into filter $D^3$. The filter cake from $D^3$ is conveyed through $H^3$ to tank J, wherein it is maintained as a fluid sludge for further use as a secondary reagent. The clear overflow from $B^4$ passes through pipe $F^8$ to join the filtrate in line $I^3$ from $D^3$, and thence is withdrawn from the process through pipe S for discharge to sewer or for treatment to utilize its carbohydrate content. The fluid sludge in J is delivered by pump $E^5$ to main pipe $K^1$, from which it is withdrawn in controlled amounts through branch pipes $K^2$, $K^3$, and $K^4$ to serve as a precipitating reagent for the incoming liquor, as will now be explained.

The hot waste sulphite liquor as it comes from the digester blow pits is accumulated in storage tank A, from which pump $E^1$ delivers it at a controlled rate of flow to $B^1$, together with the underflow from $B^2$, through $G^2$ and a controlled amount of reagent which enters through pipe $K^4$. The quantity of reagent thus added to $B^1$ is so regulated that the sulphite liquor is not carried beyond the purple stage, and hence the sludge settling out in $B^1$ is inorganic salts practically free from organic matter.

This sludge is withdrawn as underflow $G^1$ and is delivered to filter $D^1$, which yields a filtrate, that returns to the system through $I^1$, and also a filter cake composed largely of calcium sulphite, which is withdrawn at $H^1$ for use in making up fresh cooking acid.

The overflow from $B^1$ passes through $F^2$ into reaction cell $C^1$, together with the secondary lime reagent which is admitted through pipe $K^3$. The amount of reagent added at this point is gauged by the character of overflow from the subsequent tank $B^2$, and is so regulated that this overflow liquor is somewhat beyond the purple stage, but not so far beyond that the underflow from $B^1$ through $G^1$ will show an excessive amount of organic precipitate. The reaction cell $C^1$ is a revolving drum or equivalent which serves to properly mix the liquor with the reagent and give time for completion of the reaction. This cell $C^1$ is similar to the other reaction cells, and each may be connected with a steam supply pipe (not shown) for the purpose of raising or sustaining the temperature of the liquor during treatment.

The preciptate that settles out in $B^2$ is largely the inorganic calcium sulphite together with some organic matter, depending on how far the reaction has been carried in $C^1$. This sludge is returned through $G^2$ to $B^1$ wherein its organic matter is redissolved and the calcium sulphite exits to filter $D^1$.

Up to the point of overflow from $B^2$, the process has accomplished the maximum precipitation possible of calcium sulphite without an admixture with organic matter in excessive amounts, and has allowed the removal of this calcium sulphite as a clean product on filter $D^1$.

The liquor overflow from $B^2$ passes to cell $C^2$ through pipe $F^4$, together with the secondary reagent admitted through pipe $K^2$. The amount of reagent added at this point through pipe $K^2$ will be all of the filter cake currently produced at filter $D^3$, less that which has been currently used through pipes $K^3$ and $K^4$. Under normal operation such reagent will suffice to throw down the major portion of the lignin content of the sulphite liquor as a yellow flocculated precipitate, and this can be assured by regulating the amount of primary lime reagent which added through pipe Q into reaction cell $C^3$.

On completion of the reaction in cell $C^2$, the charge is delivered by the pump $E^3$ to tank $B^3$, in which the yellow precipitate settles out and is withdrawn as underflow through $G^3$ to filter $D^2$. The filtrate from $D^3$, together with the overflow from $B^3$, passes on the cell $C^3$ for the further treatment already described.

The filter cake from $D^2$ is composed of organic matter together with some fine inorganic crystals. It is either burned in the rotary furnace L to generate steam and to recover the ash for re-use as precipitating reagent in the process, or it may be withdrawn through R for further treatment in apparatus (not shown), whereby the organic and inorganic components of this material are segregated.

The inorganic crystals which are mixed with the yellow organic precipitate are largely calcium sulphite or calcium sulphate, or both; and the yellow organic matter is believed to be either the original lignin constituent of the sulphite liquor thrown down by decomposition of the lignin sulphonic acid combination or perhaps this original lignin component which has subsequently combined through its hydroxyl radical with the excess lime to form a compound analogous to a calcium phenolate or basic calcium phenolate.

The amount of lime in this yellow precipitate removed at $D^2$ normally exceeds that required to form sulphite or sulphate with the sulphur content of this material, but whether this excess represents particles of unconsumed lime reagent, or lime in some definite combination with the organic matter, is not known with certainty at this time. I have found, however, that the ash resulting from the burning of this yellow precipitate removed at $D^2$ has some reagent value in precipitating fresh sulphite liquor; hence provision is made to return this ash from the furnace L to the system either through $N^1$ and Q to cell $C^3$ or through $N^2$ or $N^4$ to the system ahead of $B^2$.

The process as above described has accomplished the complete segregation of the waste sulphite liquor into three primary products: first, an organic product consisting largely of calcium sulphite, which can be used in making fresh cooking acid; second, an organic precipitate which constitutes the entire lignin content of the liquor associated with a minor amount of inorganic crystals, and which can be utilized for fuel or other purposes; and, third, a residual liquid product that contains the carbohydrate content of the original liquor. The novelty of the process lies in the method of effecting the complete precipitation of the lignin constituent with a minimum consumption of reagent, whereby the segregation of the liquor into these three distinct products is made profitable.

What I claim, is,—

1. The process of treating waste sulphite liquor which consists in adding a reagent in solid phase form and in relative excess amount to an alkaline solution of the sulphite liquor from which the major portion of the calcium lignin sulphonic acid constituent has been previously decomposed and removed, whereby a substantially complete decomposition and precipitation of the remaining lignin sulphonic acid combination is accomplished, separating out the precipitate so formed together with its associated unconsumed reagent and using it to effect the decomposition and precipitation of the major amount of calcium lignin sulphonic acid constituent in a quantity of original sulphite liquor.

2. The process of treating waste sulphite liquor as defined in claim 1 wherein the said reagent is an alkaline earth reagent.

3. The process of treating waste sulphite liquor as defined in claim 1 wherein the said reagent is a caustic lime reagent.

4. The process of treating waste sulphite liquor which consists in adding a caustic lime reagent in solid phase form and in relative excess amount to an alkaline solution of the sulphite liquor from which the major portion of the calcium lignin sulphonic acid constituent has been previously decomposed and removed, whereby a substantially complete decomposition and precipitation of the remaining lignin sulphonic acid combination is accomplished, separating out the precipitate so formed together with its associated unconsumed reagent and using it to effect the decomposition and precipitation of the major amount of calcium lignin sulphonic acid constituent in an equivalent quantity of original sulphite liquor and segregating and recovering decomposition products of the character and in the manner described.

5. The process of treating waste sulphite liquor which consists in adding an alkaline reagent to the sulphite liquor until an inorganic and a flocculated organic precipitate is formed, separating out such precipitated matter and adding an excess of an alkaline reagent in solid phase form to the residue liquor whereby a further and practically complete precipitation of certain constituents of the liquor takes place, and finally separating such precipitate together with its associated unconsumed alkaline reagent from the residual liquor.

6. The process of treating waste sulphite liquor which consists in adding an alkaline reagent to the sulphite liquor until an inorganic and a flocculated organic precipitate is formed, separating out such precipitated matter and adding an excess of an alkaline reagent in solid phase form to the residue liquor whereby a further and practically complete precipitation of certain constituents of the liquor takes place, separating such precipitate together with its associated unconsumed alkaline reagent from the residual liquor and finally adding the unconsumed reagent thus recovered to a quantity of the original sulphite liquor.

7. The process of treating waste sulphite liquor as defined in claim 1, wherein the ash remaining from the burning of the precipitated and removed organic matter resulting from the decomposition of said calcium lignin sulphonic acid constituent, is utilized as a reagent in said process to precipitate fresh sulphite liquor.

Signed at Seattle, Washington, this 16th day of November 1926.

GUY C. HOWARD.